E. J. PARKER.
HEAT CONFINER.
APPLICATION FILED FEB. 24, 1916.
1,202,212.
Patented Oct. 24, 1916.
2 SHEETS—SHEET 1.
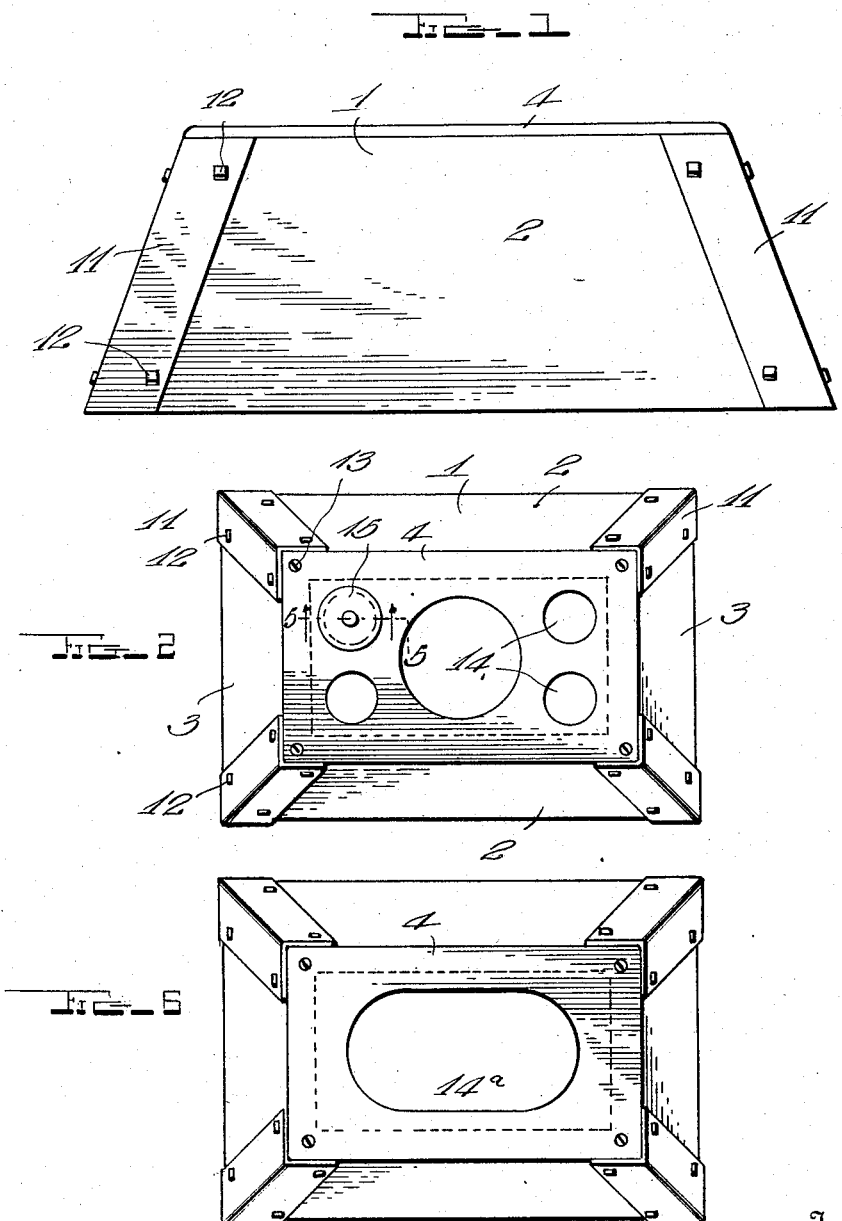

E. J. PARKER.
HEAT CONFINER.
APPLICATION FILED FEB. 24, 1916.
1,202,212.
Patented Oct. 24, 1916.
2 SHEETS—SHEET 2.
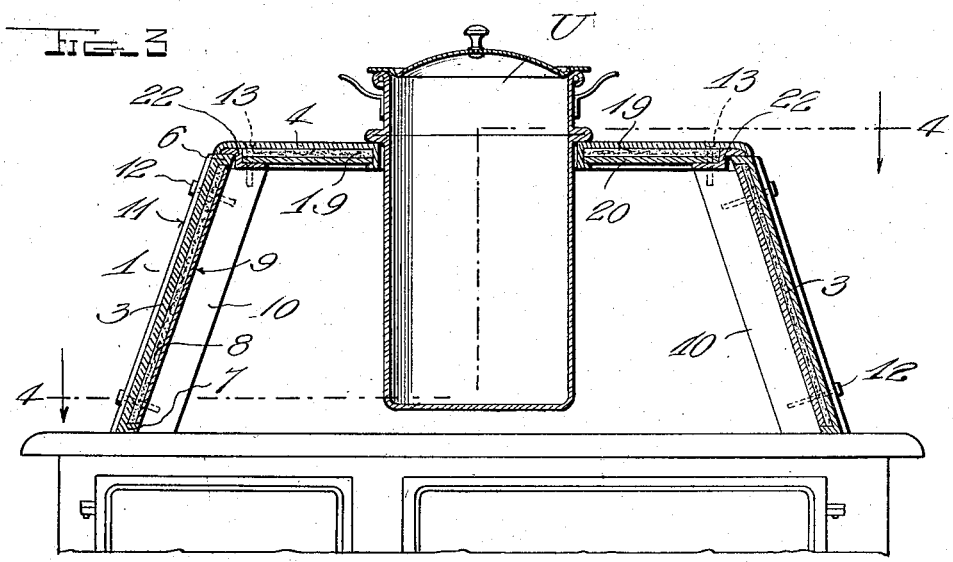
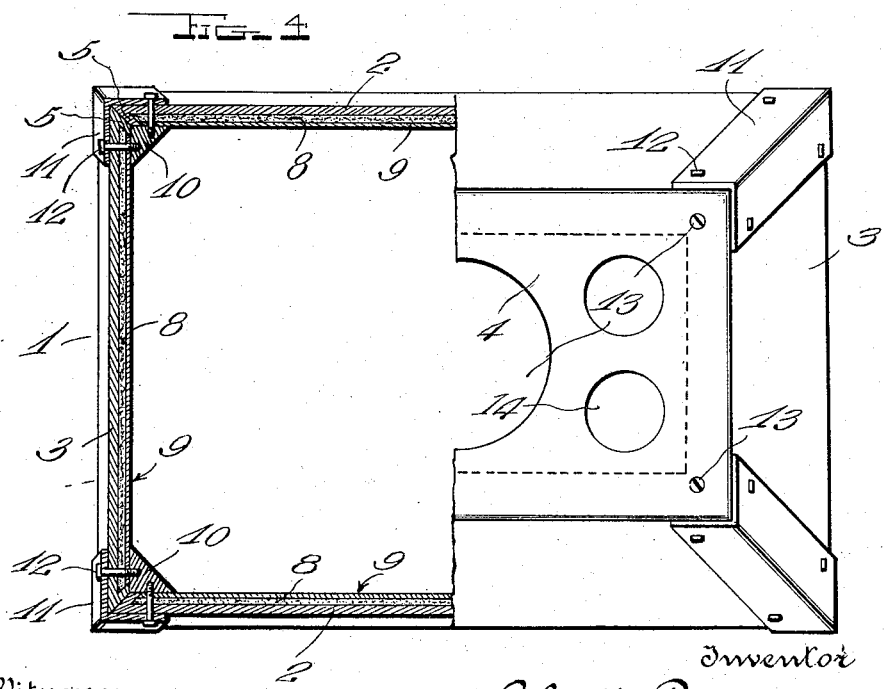
Witnesses
Inventor
Eli J. Parker

UNITED STATES PATENT OFFICE.

ELI JACKSON PARKER, OF FLORENCE, ALABAMA.

HEAT-CONFINER.

1,202,212.   Specification of Letters Patent.   Patented Oct. 24, 1916.

Application filed February 24, 1916. Serial No. 80,116.

*To all whom it may concern:*

Be it known that I, ELI JACKSON PARKER, a citizen of the United States, residing at Florence, in the county of Lauderdale and State of Alabama, have invented certain new and useful Improvements in Heat-Confiners; and I do declare the following to be a full, clear, and exact description of the invention, such as will enable others skilled in the art to which it appertains to make and use the same.

My invention is a device for confining heat from a stove around cooking utensils and the like thereon, the invention consisting briefly of a casing including upstanding side and end walls, and a top plate having openings therein to receive the utensils.

One object of the invention is to construct the device in such a manner as to allow merchants selling the same to keep in stock an assortment of top plates having openings of different sizes and shapes, any one of these plates being applicable at will to the device. Thus, the customer may purchase a top plate which meets his demands and should he desire, he may buy a number of such plates and may substitute one for the other whenever it should be advisable.

Another object of the invention is to construct the improved device of a number of flat sections which, before the articles are assembled, may be piled one upon the other and stored in little space, this being also advantageous for shipping purposes.

Yet another object is to provide simple and efficient means for securing the numerous sections together in air-tight contact, certain parts of these means serving also to secure in place a lining of heat insulating material.

With these general objects in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of the improved heat confiner; Fig. 2 is a top plan view thereof; Fig. 3 is a central vertical longitudinal section; Fig. 4 is a horizontal sectional view taken on the planes indicated by the line 4—4 of Fig. 3; Fig. 5 is a detail vertical section on the line 5—5 of Fig. 2; and Fig. 6 is a view similar to Fig. 2 but showing the application of a different type of top plate.

In specifically describing the construction shown in the drawing above briefly described, similar characters will be placed on corresponding parts throughout the several views and reference will be herein made to the numerous elements by their respective indices. To this end, the numeral 1 represents a casing having an open bottom, such casing consisting briefly of upstanding inclined side walls 2, similarly positioned end walls 3, and a top 4.

The walls 2 and 3 are each preferably constructed of a sheet metal plate having its ends bent inwardly into acute angular relation with said plate to form end flanges 5, these flanges of one plate being disposed in contact with those of adjacent plates as clearly shown in Fig. 4 to form air-tight corners for the casing 1. The upper and lower edges of the plates of which the walls 2 and 3 are constructed are also bent inwardly to form upper and lower flanges 6 and 7 of a width equal to that of the flanges 5. A heat insulating lining 8 of asbestos or any other appropriate material is applied to the inner surfaces of the walls 2 and 3, the lining of each wall being confined between the flanges 5, 6 and 7 thereof as shown. To retain the lining in proper position, thin sheet metal plates 9 preferably fit within the aforesaid flanges in contact with the inner surface of said lining. It is to be observed that the ends of the plates 9 are held against dislocation by the ends of the flanges 5, this being rather important since it allows these walls when disassembled to be handled freely without danger of the plates 9 being detached.

A plurality of upstanding corner posts 10 are disposed in the corners of the casing 1, said posts being suitably shaped for this purpose as shown most clearly in Fig. 4. Other corner posts 11 of angular formation fit over the outer corners of the casing as also shown in the figure referred to. Screws or the like 12 are then used for clamping the meeting ends of the side and end walls between the inner and outer posts, screws being preferably used for this purpose arranged as shown. By securing the side and end walls together in this manner, not only is extreme rigidity imparted to the device, but all possibility of heat escaping from the corners thereof is prevented. Furthermore, the upper ends of the inner posts 10 serve to receive screws 13 by which the top 4 is secured in place.

As heretofore stated, the top plates will be formed with openings of different sizes and shapes for the reception of utensils such as that shown at U in Fig. 3. In Figs. 2 and 4 a number of circular openings 14 are shown arranged in such a manner as to render the top shown in these figures most universally desirable, but in Fig. 6 the top 4 is formed with one elongated opening 14a which may in some cases meet the demands which could not be fulfilled by the top above described. It will be understood that the drawings show but two types of tops for illustrative purposes, but that any number thereof may be kept in stock and applied at will to the casing.

Covers 15 are preferably provided for closing the openings in the tops at will, but one of these covers being shown in the drawings for the sake of illustration (see Figs. 2 and 5). The covers 15 preferably comprise inner and outer plates 16 and 17 having an insulating lining 18 therebetween, and similarly each top 4 is provided with a lining 19 held in place by a lining plate 20. Adjacent the openings 14 or 14a as the case may be, the metal forming the top 4 is preferably crimped downwardly around the lining plate 20 as shown in Fig. 3 to hold said plate in position, while at its side and end edges, a rectangular frame 22 is provided for this purpose, said frame having its inner and outer halves offset vertically as shown clearly in Fig. 3, said outer half resting on the flanges 6 of the side and end walls 2 and 3, while the corners of the inner halves of said frame bear on the posts 10.

By constructing the device in the manner described, it will be obvious that by simply removing the screws 13, any one of an assortment of tops 4 may be applied, this assortment being kept in stock by the dealer, whereby the demands of all customers may be met. Furthermore, as above stated, the device may be stored and crated compactly and may be quickly and easily set up for use.

All parts with the exception of the screws and the posts 10 are preferably constructed of thin sheet iron or of heavy gage tin, but it will be understood that any preferred metal may be employed.

In conclusion, I will state that although in the drawings certain specific details of construction have been shown and described for accomplishing probably the best results, numerous changes may be made within the scope of the invention as claimed without sacrificing the main advantages thereof.

I claim:

1. A device of the class described comprising upstanding side and end plates disposed end to end, the ends of said plates being bent inwardly at acute angles to form end flanges, these flanges of adjacent plates being disposed in contact to form tight corners, the upper and lower edges of the side and end plates being also bent inwardly to form upper and lower flanges, a lining sheet of insulating material in contact with the inner face of each side and end plate and abutting the end and the upper and lower flanges thereof, a lining plate contacting with the inner face of each of said lining sheets and having its edges disposed in contact with the numerous flanges of its respective side or end plate, the acute angular end flanges of said plate serving to hold said lining plate in operative position, means for holding the side and end plates in assembled position, and an apertured top plate extending over said side and end plates.

2. A device of the class described comprising upstanding side and end plates disposed end to end, the ends of said plates being bent inwardly at acute angles to form end flanges, these flanges of adjacent plates being disposed in contact to form tight corners, the upper and lower edges of the side and end plates being also bent inwardly to form upper and lower flanges, a lining sheet of insulating material in contact with the inner face of each side and end plate and abutting the end and the upper and lower flanges thereof, a lining plate contacting with the inner face of each of said lining sheets and having its edges disposed in contact with the numerous flanges of its respective side or end plate, the acute angular end flanges of said plate serving to hold said lining plate in operative position, upstanding posts having angular corners received snugly in the angles between the adjacent side and end plates, the inner ends of the aforesaid end flanges and the inner surfaces of the lining plates being disposed in contact with said posts, angle metal protectors disposed over the corners formed by the meeting ends of the side and end plates, and fasteners passing through said protectors into the posts to clamp the intervening parts in operative position.

In testimony whereof I have hereunto set my hand in presence of two subscribing witnesses.

ELI JACKSON PARKER.

Witnesses:
J. A. GRIESBAUER,
L. O. HILTON.